June 30, 1970 R. H. COLE ET AL 3,518,635

DIGITAL MEMORY APPARATUS

Filed Aug. 22, 1967 6 Sheets-Sheet 1

INVENTORS
ROBERT H. COLE
ROBERT FEUER
SAMUEL NISSIM
GEORGE V. PODRAZA
BY Lindenberg & Freilich
ATTORNEY INVENTORS
ROBERT H. COLE
ROBERT FEUER
SAMUEL NISSIM
GEORGE V. PODRAZA
BY Lindenberg + Freilich
ATTORNEY

DIGITAL MEMORY APPARATUS

Filed Aug. 22, 1967 6 Sheets-Sheet 3

INVENTORS
ROBERT H. COLE
ROBERT FEUER
SAMUEL NISSIM
GEORGE V. PODRAZA
BY Lindenberg + Freilich
ATTORNEY June 30, 1970 R. H. COLE ET AL 3,518,635

DIGITAL MEMORY APPARATUS

Filed Aug. 22, 1967 6 Sheets-Sheet 4

INVENTORS
ROBERT H. COLE
ROBERT FEUER
SAMUEL NISSIM
GEORGE Y. PODRAZA
BY Lindenberg + Freilich
ATTORNEY

DIGITAL MEMORY APPARATUS

Filed Aug. 22, 1967 6 Sheets-Sheet 5

INVENTORS
ROBERT H. COLE
ROBERT FEUER
SAMUEL NISSIM
GEORGE V. PODRAZA
BY Lindenberg + Freilich
ATTORNEY INVENTORS
ROBERT H. COLE
ROBERT FEUER
SAMUEL NISSIM
GEORGE V. PODRAZA
BY Lindenberg & Freilich
ATTORNEY United States Patent Office 3,518,635
Patented June 30, 1970

3,518,635

DIGITAL MEMORY APPARATUS

Robert H. Cole, Canoga Park, Samuel Nissim, Malibu, and George V. Podraza, Canoga Park, Calif., and Robert Feuer, Wayne, N.J., assignors to The Bunker-Ramo Corporation, Canoga Park, Calif., a corporation of Delaware Filed Aug. 22, 1967, Ser. No. 662,457
Int. Cl. G11c *11/40;* H03k *3/286*
U.S. Cl. 340—173 13 Claims

ABSTRACT OF THE DISCLOSURE

A low power digital memory comprised of a matrix of memory cells suitable for fabrication by large scale integrated circuit techniques. Each memory cell is comprised of field effect transistors, preferably metal oxide semiconductors. A plurality of cells are fabricated on a single monolithic chip and are interconnected for coincident signal addressing. Power is conserved by periodically pulsing load transistors rather than biasing them continuously on.

ORIGIN OF THE INVENTION

The invention herein described was made in the course of or under a contract or subcontract thereunder, with United States Air Force Systems Command, Wright-Patterson Air Force Base.

BACKGROUND OF THE INVENTION

Field of the invention

This invention relates generally to digital memory apparatus and more particularly to a low power semiconductor memory suitable for fabrication by large scale integrated circuit techniques.

The continuing evolution in integrated circuit technology has progressed to the point of making it feasible to fabricate active memory circuits, as for example the type disclosed in U.S. patent application Ser. No. 455,546, filed May 13, 1965 (now Pat. No. 3,447,137) by Robert Feuer and assigned to the same assignee as the present application, by large scale integration techniques. Integrated memories are presently being developed with various degrees of emphasis on those characteristics which make them competitive with the more conventional forms of memories. Advantages offered by integrated circuit memories include high speed, miniaturization, low power, nondestructive readout, and reduced peripheral complexity in small scale memories. A noteworthy disadvantage of active circuit memories, of course, is their volatility.

The present invention is directed to a digital memory employing active nondestructive readout memory cells and organized in a manner particularly suiting the memory to fabrication by large scale integration techniques on a monolithic chip.

SUMMARY OF THE INVENTION

Briefly, the present invention is directed to a coincident signal addressing low power memory comprised of improved active memory cells, which memory is well suited for fabrication by large scale integration techniques. In a preferred embodiment of the invention, the cells are fabricated in a matrix array on a monolithic chip.

Normally, the complexity of circuitry formed on monolithic chips is limited by the number of available connecting pins. In accordance with a significant feature of the present invention, cell decoding means are provided on the chip and coincident signal addressing is employed to thus increase the number of cells which can be individually addressed on a single monolithic chip having a limited pin capacity.

In accordance with a further feature of the present invention, power dissipation of the memory cell is minimized by using load transistors (in lieu of conventionally employed resistors) and by periodically pulsing the load transistors rather than continuously biasing them on.

In accordance with alternate embodiments of the invention, means are respectively incorporated in each memory cell to increase the readout current and reduce the required amplitude of the addressing signals used for coincident selection. By increasing readout signal amplitude, the sense amplifier requirements can be relaxed. By reducing addressing signal amplitudes, cross-talk is minimized.

BRIEF DESCRIPTION OF THE DRAWINGS

FIG. 1(*b*) comprises a chart illustrating characteristics of a typical enhancement mode metal oxide semiconductor;

DESCRIPTION OF THE PREFERRED EMBODIMENTS

Figure 1A:
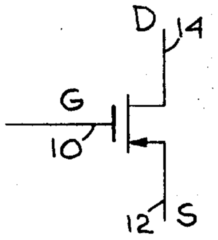
FIG. 1(*a*) is a diagram illustrating the symbol used to represent a metal oxide semiconductor.
Figure 1B:
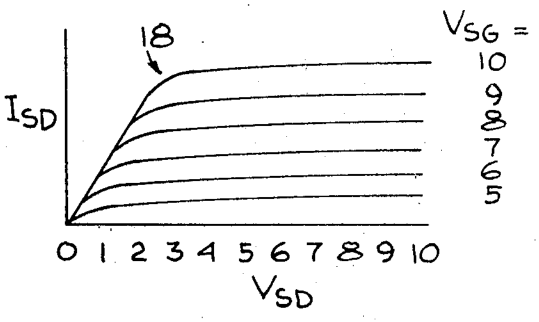

Attention is initially called to FIGS. 1(*a*) and 1(*b*) which symbolically respectively illustrate a field effect transistor, such as a metal oxide semiconductor, and its operational characteristics. A semiconductor of this type is discussed in detail in "IEEE Transactions on Electronic Devices," July 1964, pages 324–345. Its characteristics will only be briefly considered herein.

The metal oxide semiconductor shown in FIG. 1(*a*) includes a control terminal or gate 10, a first current conducting terminal or source 12, and a second current conducting terminal or drain 14. The illustrated semiconductor is a bilateral device and as a matter of fact is usually substantially symmetric so that the source and drain terminals are effectively interchangeable. FIG. **1(*b*) is a chart plotting the current ($I_{SD}$) through the source and drain terminals as a function of the source-drain potential ($V_{SD}$) and illustrates a family of operational curves for different values of source-gate potential ($V_{SG}$). It can be seen that for the semiconductor illustrated, a five volt threshold level from source to gate has been assumed. Note that for any value of $V_{SG}$, the current $I_{SD}$ increases rapidly for low values of $V_{SD}$ prior to a knee 18 in the characteristic curves. After the voltage $V_{SD}$ is increased to beyond the knee 18**, the current $I_{SD}$ increases only very slightly as $V_{SD}$ is increased.

Figure 2:
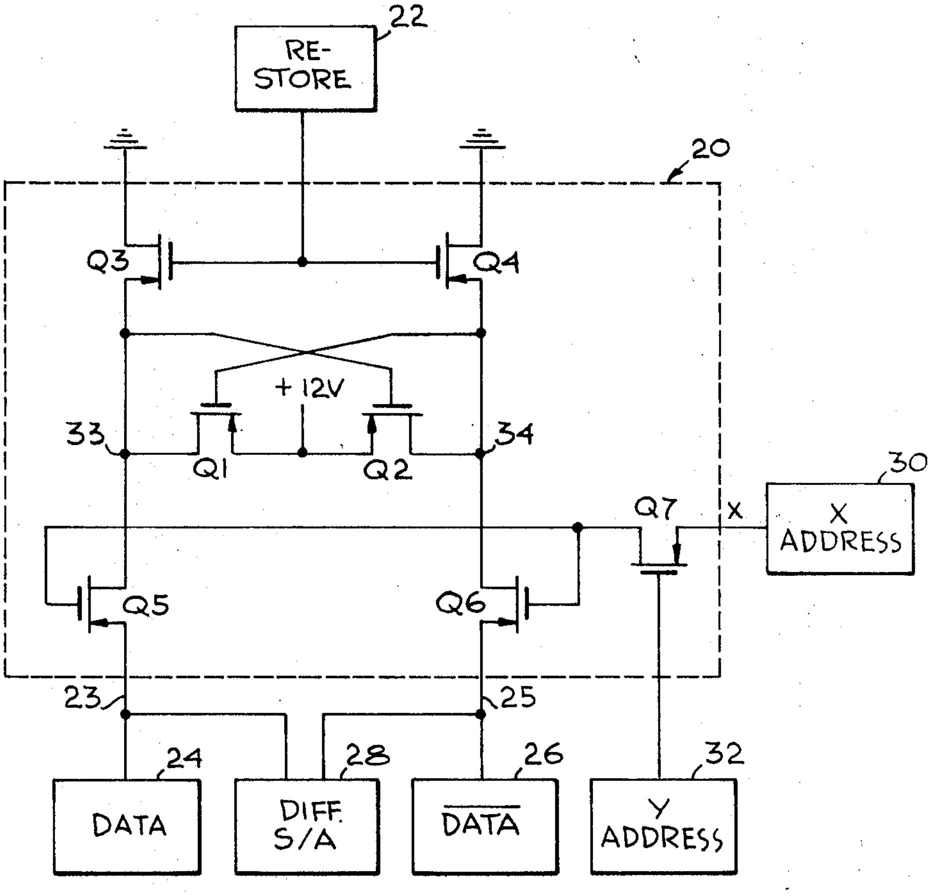
FIG. 2 is a preferred embodiment of a memory cell in accordance with the present invention.

With the foregoing operational characteristics described by FIG. 1(*b*) in mind, attention is now called to FIG. 2 which schematically illustrates a preferred embodiment of binary memory cell 20 which preferably employs metal oxide semiconductors of the type illustrated in FIG. 1. The memory cell 20 includes first and second metal oxide semiconductors Q1 and Q2 each of which includes a gate, a source, and a drain. As will be seen hereinafter, the semiconductors Q1 and Q2 are interconnected to form a bistable circuit such that when semiconductor Q2 is forward biased, semiconductor Q1 is off biased and conversely when semiconductor Q1 is forward biased, semiconductor Q2 is off biased. The source terminals of semiconductors Q1 and Q2 are connected together and to a first source of reference potential, herein illustrated as +12 volts. The drain terminal of semiconductor Q2 is connected to the gate terminal of semiconductor Q1 and the drain terminal of semiconductor Q1 is connected to the gate terminal of semiconductor Q2.

The drain terminals of semiconductors Q1 and Q2 are respectively connected through capacitive loads to a second source of reference potential, herein illustrated as ground. More particularly, the drain terminal of semiconductor Q1 is connected to the source terminal of semiconductor Q3 whose drain terminal is connected to ground. Similarly, the drain terminal of semiconductor Q2 is connected to the source terminal of semiconductor Q4 whose drain terminal is connected to ground. The semiconductor elements common to nodes 33 and 34 provide inherent capacitance at these nodes. Any voltage built up on these capacitances (due to leakage current) is discharged by the forward biasing of semiconductors Q3 and Q4. The gate terminals of the load semiconductors Q3 and Q4 are connected together and to a source of restore pulses 22. As will be shown hereinafter, the restore pulse source 22 periodically applies pulses to the gates of semiconductors Q3 and Q4 to intermittently forward bias them in order to conserve power, as contrasted with having the semiconductors Q3 and Q4 continually biased on.

The drain terminals of semiconductors Q1 and Q2 are respectively connected to semiconductor switches Q5 and Q6, also preferably metal oxide semiconductors each having a gate, a source, and a drain. More particularly, the drain of semiconductor Q1 is connected to the corresponding terminal of semiconductor Q5. The source of semiconductor Q5 is connected to a digit line 23 connected to the output of a first data signal source 24. Similarly, the drain of semiconductor Q2 is connected to the drain of semiconductor Q6 and the source of semiconductor Q6 is connected to digit line 25 which is connected to the output of a complement data signal source 26. Additionally, the source terminals of semiconductors Q5 and Q6 are connected across the input of a differential sense amplifier 28.

The semiconductor switches Q5 and Q6 are both controlled by a switch control or decoding means comprised of semiconductor Q7. More particularly, the output lead of the decoding means, i.e. the drain of semiconductor Q7 is connected to the gate terminals of semiconductors Q5 and Q6. The gate and source terminals of semiconductor Q7 are respectively connected to address signal sources; namely, the X address signal source 30 and the Y address signal source 32.

Semiconductors Q1 and Q2 form a bistable or flip-flop circuit constituting the basic storage element of the cell 20. Operation of the flip-flop is such that when one semiconductor (e.g. Q1) is biased on, the other semiconductor (e.g. Q2) is biased beyond cut off. As noted, semiconductors Q3 and Q4 respectively serve as loads for semiconductors Q1 and Q2. Semiconductors Q5 and Q6 function as switches to permit data signals to be applied to the basic flip-flop circuit in order to change its state.

In order to demonstrate that the memory cell 20 of FIG. 2 is bistable, initially assume semiconductor Q1 to be biased on with semiconductor Q2 being biased off. Under these conditions, the voltage at node 33, i.e. at the drain of semiconductor Q1, will be approximately +12 volts. The voltage at node 34, i.e. at the drain of semiconductor Q2, will be near ground potential. During quiescent operation, the capacitance of the node 34 will begin to charge toward +12 volts because of the leakage current through the PN junctions common to this node. These PN junctions are constituted by the drains of semiconductors Q2 and Q6 and the source of semiconductor Q4. The voltage buildup on the capacitance at node 34 by leakage would eventually cause semiconductor Q1 to turn off thus causing loss of the logic state stored by the flip-flop circuit. To prevent this, source 22 periodically applies a restore pulse to the gate terminals of semiconductors Q3 and Q4. This results in the discharging of the capacitance at node 34. During the application of the restore pulse when semiconductor Q1 is on, the voltage at node 33 is not appreciably affected since semiconductor Q1 preferably has a much greater transconductance than semiconductor Q3. The worst case design situation requires that periodicity of the restore pulse be sufficient to keep the drain node of the off semiconductor (Q1 or Q2) properly discharged under conditions of worst case leakage current.

In order to either read from or write into the memory cell 20, the semiconductor switches Q5 and Q6 are forward biased in response to the control or decoding means Q7 being forward biased. More particularly, in order to either read from or write into a particular cell, the X and Y address signal sources 30 and 32 associated with that cell are energized to apply signals [lines (*a*) and (*b*), FIG. 3] to the gate and source of semiconductor Q7 thereof. For example, the X and Y address signals respectively applied to the source and gate of semiconductor Q7 can each be on the order of −26 volts (e.g. +12 v. to −14 v.). Coincidence of the X and Y address pulses on semiconductor Q7 causes it to conduct (conventional current into X address signal source 30) thereby forward biasing the gates of semiconductors Q5 and Q6.

Writing is accomplished by applying a write pulse through one of the switch semiconductors to the appropriate semiconductor Q5 or Q6 simultaneously with the coincident address pulses applied to the semiconductor Q7. Let the "1" state be defined by semiconductor Q1 conducting and semiconductor Q2 off. If a "0" is to be written into the cell 20, the write pulse [line (*c*), FIG. 3], which for example rises from ground to +12 volts, is applied from the complement data signal source 26 to the source of semiconductor Q6 substantially simultaneously with the application of the address signals to semiconductor Q7. During this write time, the source terminal of semiconductor Q5 is held at ground potential by source 24. As a consequence, semiconductor Q6 conducts current into the capacitance at node 34, thus turning off semiconductor Q1. The semiconductor Q1 drain node 33 is then discharged toward ground through semiconductor switch Q5, resulting in the turn on of semiconductor Q2. The removal of the address signals [lines (*a*) and (*b*), FIG. 3] applied to semiconductor Q7 and the write signals [line (*c*), FIG. 3] applied to semiconductors Q5 and Q6 then maintain the cell 20 in the "0" state.

Readout of the cell 20 is accomplished by addressing the cell in the same manner as for writing. The digit lines 23 and 25 coupled to the data signal sources 24 and 26 respectively are held near ground potential for read. When addressing takes place, current from the "on" semiconductor in the flip-flop circuit, i.e. either semiconductor Q1 or Q2, will flow through either semiconductor Q5 or Q6 [line (*d*), FIG. 3]. The drain node of the "off" semiconductor Q1 or Q2 will be near ground potential and hence will not cause a current flow through the corresponding semiconductor switch Q5 or Q6. The differential sense amplifier 28 is strobed [line (*e*), FIG. 3] and responds to the current on either one of the digit lines to provide the output signal shown in line (*f*) of FIG. 3.

Figure 3:
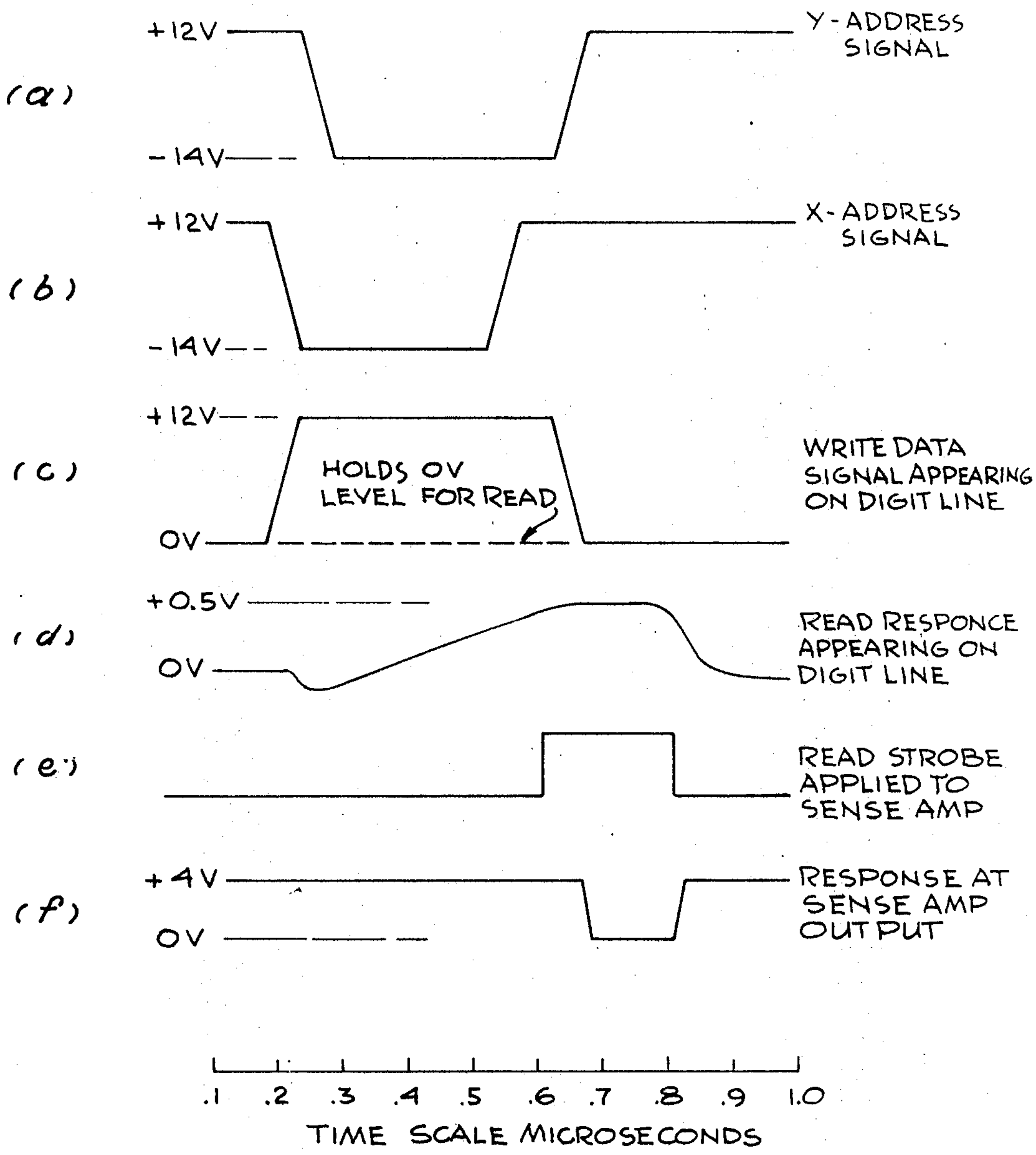
FIGS. 3*a–b* illustrate typical waveforms used in the operation of the cell of FIG. 2.

As shown in lines (*a*) and (*b*) of FIG. 3, the Y address pulse applied to the gate of semiconductor Q7 by source 32 has a slightly longer duration than the X address pulse provided by source 30 because the gates of semiconductors Q5 and Q6 must be maintained near a +12 volt potential to keep the cell in the non-addressed state. During coincidence of the negative address pulses on semiconductor Q7 which go from a +12 volt level to approximately −14 volts, the gates of semiconductors Q5 and Q6 reach approximately a −9 volt level. If the trailing edges of the X and Y address pulses provided by the sources 30 and 32 were coincident, semiconductor Q7 would be turned off leaving the gates of semiconductors Q5 and Q6 biased on, thereby unintentionally leaving the cell in an addressed state. By making the X address pulse trailing edge revert back to the +12 volt level ahead of the Y address pulse, the gates of semiconductors Q5 and Q6 are forced to +12 volts by the reversal of current through semiconductor Q7 and the cell is left in the non-addressed state. Since the leakage current through semiconductor Q7 tends to charge the drain node capacitance thereof with a positive voltage, the non-addressed state for the cell is maintained during quiescent operation.

Figure 4:
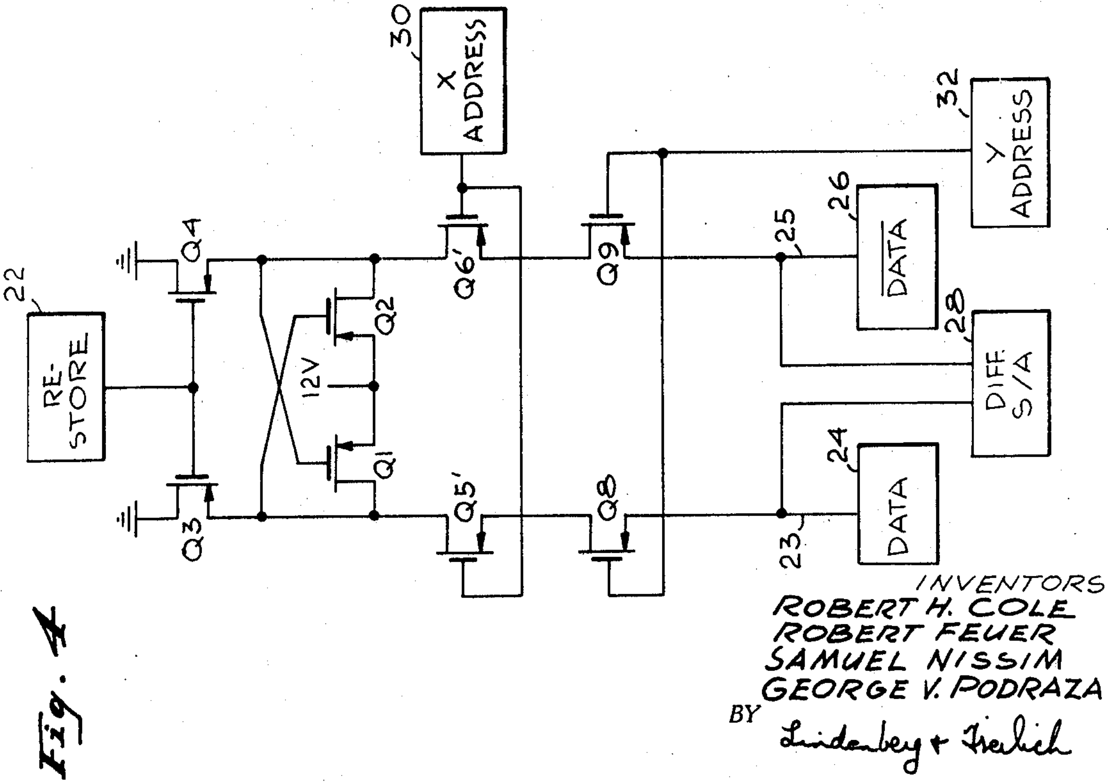
FIG. 4 is an alternate memory cell embodiment in accordance with the invention.

It is to be noted that in the circuit of FIG. 2, the voltage amplitude appearing at the drain terminal of semiconductor Q7 during addressing is equal to the amplitude of the Y address signal applied to the gate of semiconductor Q7 minus a threshold voltage ($V_T$) which has been assumed to be five volts. Inasmuch as the voltage at the drain of semiconductor Q7 is applied to the gates of semiconductors Q5 and Q6, the minimum voltage level which can be attained at the drains of semiconductors Q5 and Q6 applied to the nodes 33 and 34 is equal to the amplitude of the Y address signal minus the sum of two threshold voltages (i.e. the voltage at the node 34 during addressing will be equal to the Y address signal voltage minus the sum of the threshold voltages of semiconductors Q7 and Q6). Since it is necessary that the voltage at the node to be discharged reach ground potential, it follows that relatively large amplitude Y address voltage pulses have to be employed in the operation of the circuit of FIG. 2. In certain applications, the utilization of large amplitude address pulses has resulted in crosstalk disturbance between digit lines in proximity to one another. In order to reduce the amplitude requirements of the address pulses required by the circuit of FIG. 2, an alternative embodiment of the invention is illustrated in FIG. 4. In the circuit of FIG. 4, the semiconductors Q5′ and Q6′ are intended to correspond to the semiconductors Q5 and Q6 of FIG. 2. In lieu of utilizing the semiconductor Q7 of FIG. 2 to control the biasing of both semiconductors Q5′ and Q6′, semiconductors Q8 and Q9 are provided which are respectively connected in series with the semiconductors Q5′ and Q6′. More particularly, the source of semiconductor Q8 is connected to the digit line 23 connected to the data signal source 24. The drain of semiconductor Q8 is connected to the source of semiconductor Q5′. Similarly, the source of semiconductor Q9 is connected to digit line 25 connected to the complement data signal source 26 and the drain of semiconductor Q9 is connected to the source of semiconductor Q6′.

The gates of semiconductors Q5′ and Q6′ are connected together and to the output of the X address signal source 30. Similarly, the gates of semiconductors Q8 and Q9 are connected together and to the output of the Y address signal source 32. The digit lines 23 and 25 are connected to the input terminals of the differential sense amplifier 28. By employing the configuration illustrated in FIG. 4, the minimum voltage levels which the drains of semiconductors Q1 and Q2 can reach are equal to the amplitudes of the address signals provided by sources 30 and 32 minus only one threshold voltage ($V_T$) instead of two threshold voltages as was the situation in the circuit of FIG. 2. More particularly, since it is necessary to pull the voltage at the drain of either semiconductor Q1 and Q2 to ground during addressing, the amplitude of the X address pulse must be more negative than one threshold voltage. Similarly, the voltage level appearing at the drain of semiconductor Q8 or Q9 and applied to the source of semiconductor Q5′ or Q6′ must also be pulled to ground potential. Thus the Y address pulse level must also be more negative than one threshold voltage. Thus, whereas an embodiment of the circuit of FIG. 2 may require address pulses of 26 volt amplitude, an embodiment of the circuit of FIG. 3 can employ address pulses of approximately 18 to 20 volts. By reducing the address pulse amplitude, the incident of crosstalk is considerably reduced.

Figure 5:
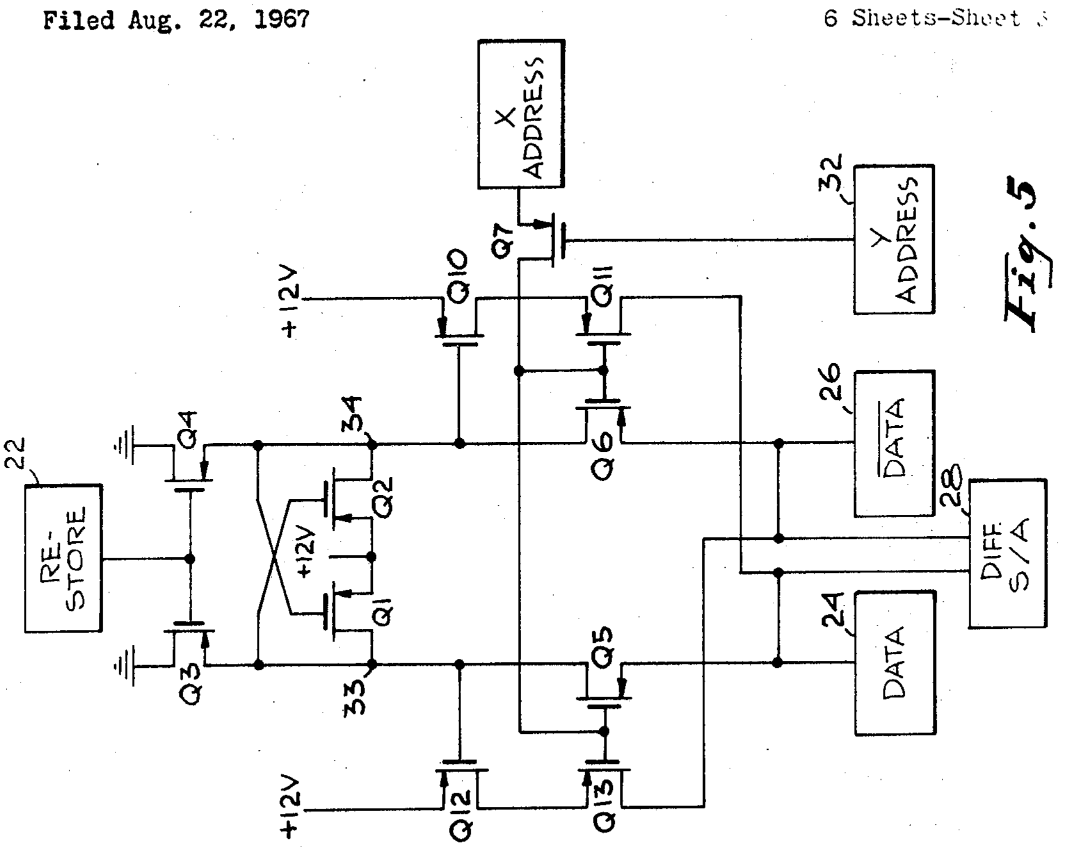
FIG. 5 is a still further memory cell embodiment in accordance with the invention.

Attention is now called to FIG. 5 which illustrates a further memory cell embodiment, similar to the embodiment of FIG. 2, but however capable of delivering a higher readout current and thereby reducing the sensitivity required of the sense amplifier 28. In accordance with the embodiment of FIG. 5, a first auxiliary current source, comprised of semiconductors Q10 and Q11 in series, is connected to the left terminal of amplifier 28 to add to the current supplied thereto by semiconductor Q5 on readout. Similarly, a second auxiliary current source including semiconductors Q12 and Q13 connected in series, adds to the current passed by semiconductor Q6 on readout.

More particularly, the source of semiconductor Q10 is connected to a source of reference potential, herein illustrated as +12 volts. The gate of semiconductor Q10 is connected to the drain of semiconductor Q2. The drain of semiconductor Q10 is connected to the source of semiconductor Q11. The gate of semiconductor Q11 is connected to the drain of semiconductor Q7. The drain of semiconductor Q11 is connected to the same input terminal of differential sense amplifier 28 as is the source of semiconductor Q5. The semiconductors Q12 and Q13 are also connected in series and provide current to the same input terminal of amplifier 28 as does the semiconductor Q6.

In the operation of the embodiment of FIG. 5, assume that the cell stores a "1." As a consequence, semiconductor Q1 will be conducting and node 33 will be at approximately +12 volts. The drain (i.e. node 34) of semiconductor Q2 will be at substantially ground potential. When the cell is addressed to forward bias semiconductor Q7, semiconductor switch Q5 will conduct current to the left input terminal of sense amplifier 28. Inasmuch as node 34 will be at substantially ground potential, the semiconductor Q6 will not conduct any appreciable current to the right input terminal of amplifier 28. However, semiconductors Q10 and Q11 will conduct current to the left input terminal of amplifier 28 aiding the current provided thereto by the semiconductor Q5. More particularly, the ground potential applied to the gate of semiconductor Q10 will forward bias semiconductor Q10 and provide a sufficient potential to the source of semiconductor Q11 to cause conduction therethrough for so long as semiconductor Q7 is conducting.

From the foregoing, it should be appreciated that several memory cell embodiments have been disclosed herein each of which is capable of being addressed by the coincident application of X and Y address signals to first and second electrodes of a decoding means such as semiconductor Q7. The memory cells thus far disclosed comprise active circuits employing field effect transistors such as metal oxide semiconductors. As is now well known in the art, such circuits can be fabricated on monolithic chips by large scale integration techniques. Such large scale integration techniques are discussed at length in a special report appearing in the issue of "Electronics," Feb. 20, 1967. The circuit complexity that can be attained on monolithic chips is not usually limited by fabrication techniques but rather is normally limited by the number of terminals which can be discretely defined along the edge of the chip. As will be seen hereinafter, the chips are normally used in flat pack or similar structural packages in which the package connecting pins must be physically and electrically connected to the monolithic chip terminals.

Figure 6:
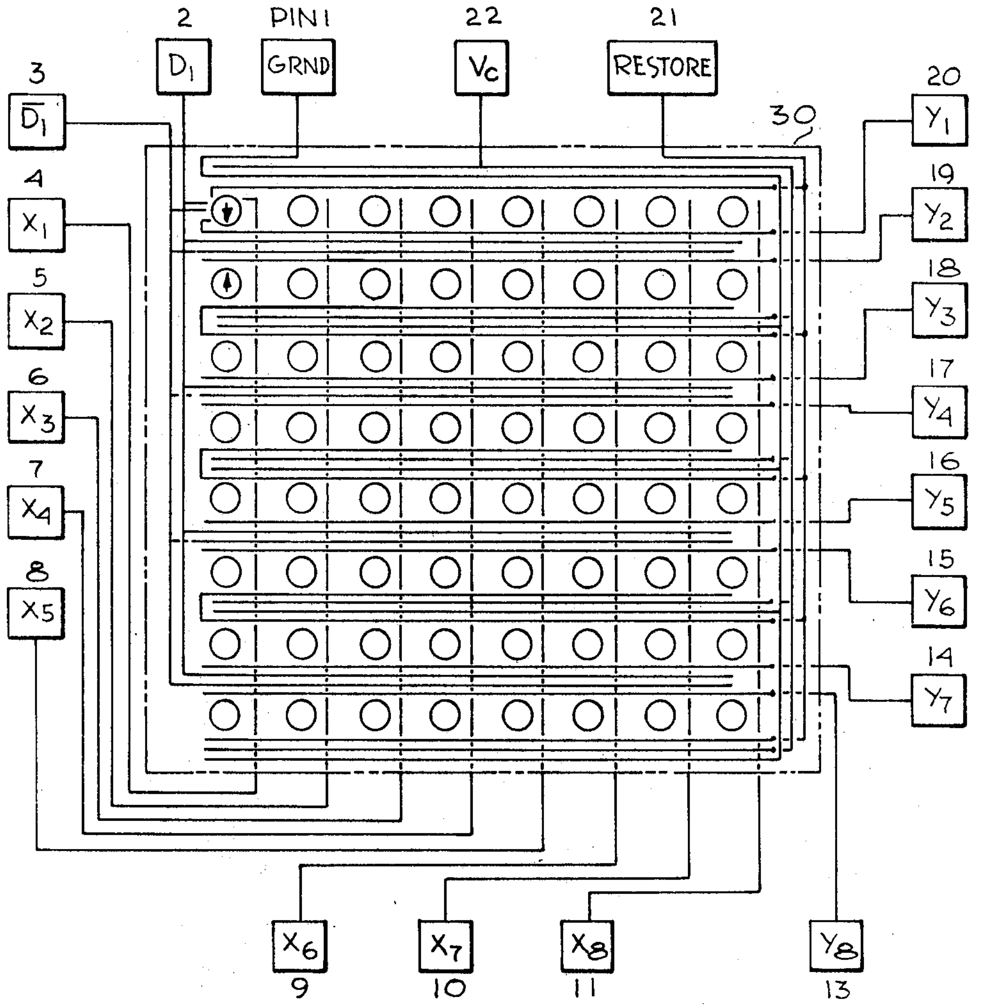
FIG. 6 is a schematic illustration of a memory cell matrix indicating the manner in which a plurality of memory cells can be organized on a monolithic chip.

Because of the limited number of terminals which can be provided on a monolithic chip, it has in the past been common practice to organize digital memories on a chip in a word oriented fashion. Thus, for example, eight words could be provided on a chip and eight word lines could be connected to eight terminals on the chip. The provision of coincident selection memory cells of the type shown in FIGS. 2, 4, and 5 herein enables a digital memory to be constructed in accordance with the invention which permits greater complexity on a single chip with the result that an entire memory can be more simply fabricated. More particularly, a monolithic chip can be provided in accordance with the invention, as is shown in FIG. 6, in which a plurality of memory cells, e.g. 64, can be provided with each defining one bit of a different word. Thus, utilizing eight memory chips identical to that shown in FIG. 5, a 64 word digital memory having a word length of eight bits can be provided. The connection of the address signal sources 30 and 32 will be identical to all eight chips.

FIG. 6 schematically illustrates the physical organization of a memory matrix employing memory cells of the type illustrated in FIGS. 2, 4, and 5 on a monolithic chip 30 assumed to have a twenty-two terminal or pin capacity. As can be noted in FIG. 6, the pins are consecutively numbered in a counterclockwise direction. Ground potential is applied to pin 1. Pins 2 and 3 respectively are intended to respectively connect the digit lines 34 and 33 to the complement data signal source 26 and the data signal source 24. Pins 4–11 are respectively intended to be connected to eight different X address signal sources X1–X8. Pins 13–20 are intended to be connected to eight different Y address signal sources Y8–Y1. The output of the restore pulse source 22 is intended to be connected to pin 21 and the +12 volt potential utilized in each of the embodiments of FIGS. 2, 4, and 5 is intended to be applied to pin 22.

The cells are arranged in a rectangular matrix of first and second groups (i.e. rows and columns). All of the cells common to a single row or column are connected to the same X or Y selection line. It is desirable that the number of crossover interconnections is minimized. In view of this, the memory cells of FIG. 6 have been arranged so that alternate rows are alternately inverted. Thus, the memory cells of row 1 are oriented as shown in FIGS. 2, 4, and 5. On the other hand, the memory cells of row 2 are physically oriented in an inverted manner. Similarly, the cells of rows 3, 5, and 7 are oriented as shown in FIGS. 2, 4, and 5 and the cells of rows 4, 6, and 8 are oriented oppositely. The row or Y selection lines Y1 and Y2 are carried by the chip between rows 1 and 2. The data signal and data signal complement lines extending from pins 2 and 3 also extend between rows 1 and 2, between rows 3 and 4, between rows 5 and 6, and between rows 7 and 8. On the other hand, as illustrated in FIG. 6, the conductors from pins 1, 22, and 21 respectively carrying ground potential, positive potential, and the restore pulses are disposed along the top and bottom edges of the chip and between rows 2 and 3, 4 and 5, and 6 and 7. The X or column conductors run vertically through the matrix as shown in FIG. 6.

Figure 7:
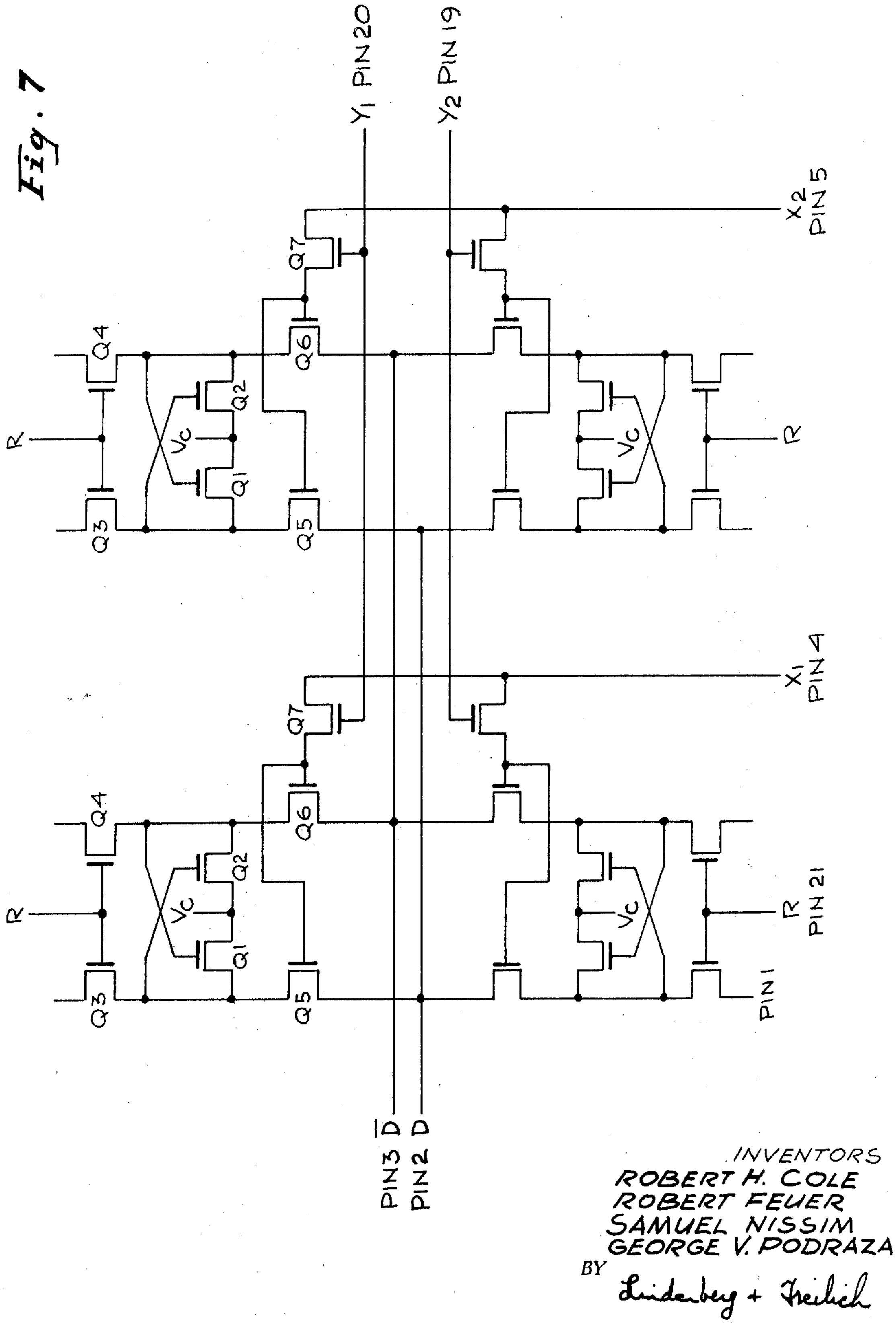
FIG. 7 schematically illustrates in greater detail the manner in which memory cells in accordance with the invention are interconnected.

Attention is now called to FIG. 7 which illustrates in greater detail than is shown in FIG. 6, the manner in which four typical cells, i.e. the cells of rows 1 and 2 and columns 1 and 2 of the matrix, are interconnected.

Figure 8:
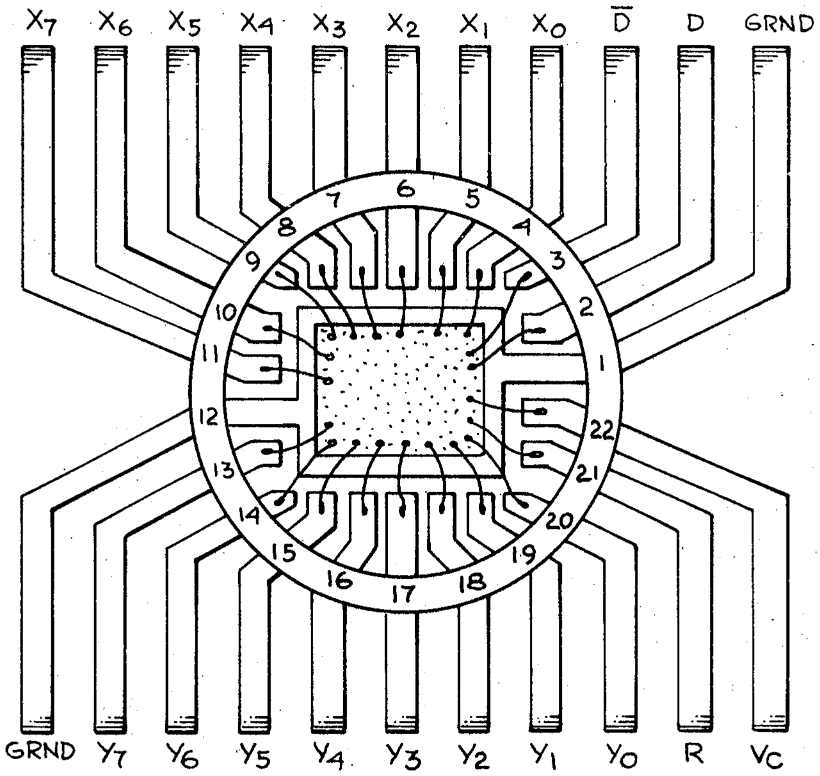
FIG. 8 schematically illustrates the monolithic chip of FIG. 6 mounted in a flat pack.

A monolithic chip of the type schematically illustrated in FIG. 6 has been fabricated by large scale integration techniques. Utilizing the circuit configurations shown herein, 64 memory cells interconnected for coincident addressing were formed on a monolithic chip 80 mils by 100 mils. Such a chip can be packaged in a substantially conventional flat pack package as shown in FIG. 8 with the connecting pins extending horizontally therefrom. Alternatively, of course, other packaging configurations such as in-line packages can be employed.

From the foregoing, it should be recognized that improved active circuit nondestructive readout memory cells have been provided herein which can be packaged very densely and which consume relatively small amounts of power. Increased packaging density is achieved as a consequence of including decoding means on the chip and using coincident addressing to enable a maximum number of active circuits to be operationally carried by a monolithic chip having a particular terminal capacity. It is pointed out that although a particular decoding means (e.g. semiconductor Q7) has been illustrated herein as being carried by the chip, other more complex decoding circuits could be mounted on the chip in accordance with the invention. It is also pointed out that the teachings of the invention can be extended to include the read (i.e. sense amplifier), write (i.e. data signal source) and restore circuitry on the chip.

Reduction of power dissipation is achieved in accordance with the invention as a consequence of periodically forward biasing load semiconductors to discharge capacitance, rather than continuously on biasing the load semiconductors.

Although particular embodiments of the invention have been illustrated and described herein, it is recognized that modifications and variations will occur to those skilled in the art and consequently, it is intended that the scope of the invention be determined only by a just interpretation of the appended claims.

The embodiments of the invention in which an exclusive property or privilege is claimed are defined as follows:

1. A binary memory cell comprising:

first and second semiconductors each capable of being either forward biased or off biased;

means interconnecting said first and second semiconductors for holding said first semiconductor off biased in response to said second semiconductor being forward biased and for holding said second semiconductor off biased in response to said first semiconductor being forward biased;

data control means for selectively applying forward and off biasing binary data signals to said first and second semiconductors, said data control means including first and second complementary data signal sources and normally open first and second switches for respectively connecting said first and second semiconductors to said first and second data signal sources, each of said switches comprising a field effect transistor having a gate, a source, and a drain; and a switch control means coupled to the gates of said first and second switches having at least first and second electrodes and responsive to first and second signals respectively concurrently applied thereto for closing said normally open switches.

2. The memory cell of claim 1 wherein said switch control means comprises a field effect transistor having a gate, a source, and a drain and wherein said first and second electrodes respectively comprise the source and the gate thereof; and means coupling said switch control means drain to said first and second switch gates.

3. A binary memory cell comprising:

a first and second semiconductors;

means for selectively forward biasing said first and second semiconductors;

means interconnecting said first and second semiconductors for holding said first semiconductor off biased in response to said second semiconductor being forward biased and for holding said second semiconductor off biased in response to said first semiconductor being forward biased;
first and second capacitive loads respectively coupled to said first and second semiconductors; and
means for periodically discharging said first and second capacitive loads.

4. The memory cell of claim 3 wherein said means for selectively forward biasing said first and second semiconductors includes a source of data signals and first and second normally open switches respectively connecting said source of data signals to said first and second semiconductors; and
a switch control means having at least first and second electrodes and responsive to first and second signals respectively concurrently applied thereto for closing said normally open switches.

5. A binary memory cell comprising:
first and second semiconductors each including a control terminal and first and second current conducting terminls;
a first source of reference potential;
means connecting each of said first current conducting terminals to said first source of reference potential;
a second source of reference potential;
a first capacitive load means connecting said first semiconductor second current conducting terminal to said second source of reference potential;
a second capacitive load means connecting said second semiconductor second current conducting terminal to said second source of reference potential;
means connecting said first semiconductor second current conducting terminal to said second semiconductor control terminal for holding said second semiconductor cut off when said first semiconductor is conducting;
means connecting said second semiconductor second current conducting terminal to said first semiconductor control terminal for holding said first semiconductor cut off when said second semiconductor is conducting;
data control means for selectively applying forward biasing binary data signals to said first and second semiconductors; and
means for periodically discharging said first and second capacitive loads.

6. The memory cell of claim 5 wherein each of said first and second semiconductors comprises a metal oxide semiconductor and wherein said control and first and second current conducting terminals thereof respectively constitutes the gate, source, and drain of said metal oxide semiconductor.

7. The memory cell of claim 5 wherein said first and second capacitive loads respectively include first and second metal oxide semiconductors each having a gate, a source, and a drain;
means respectively connecting said first capacitive load means drain and source to said first semiconductor second current conducting terminal and said second source of reference potential;
means respectively connecting said second capacitive load means drain and source to said second semiductor second current conducting terminal and said second source of reference potential.

8. The memory cell to claim 5 wherein said data control means includes a source of data signals and first and second switches respectively coupling said data signal source to said first and second semiconductors.

9. The memory cell of claim 8 wherein each of said first and second switches comprises a field effect transistor having a gate, a source, and a drain;
a switch control means having at least first and second electrodes and responsive to first and second signals respectively concurrently applied thereto for closing said first and second switches; and means coupling said switch control means to the gates of said first and second switches.

10. A binary memory cell comprising:
first and second semiconductors each including a control terminal and first and second current conducting terminals;
a first source of reference potential;
means connecting each of said first current conducting terminals to said first source of reference potential;
a second source of reference potential;
a first capacitive load means connecting said first semiconductor second current conducting terminal to said second source of reference potential;
a second capacitive load means connecting said second semiconductor second current conducting terminal to said second source of reference potential;
means connecting said first semiconductor second current conducting terminal to said second semiconductor control terminal for holding said second semiconductor cut off when said first semiconductor is conducting;
means connecting said second semiconductor second current conducting terminal to said first semiconductor control terminal for holding said first semiconductor cut off when said second semiconductor is conducting;
a source of data signals;
first and second switches respectively coupling said data signal source to said first and second semiconductors; and
a switch control means having at least first and second electrodes and responsive to first and second address signals respectively concurrently applied thereto for closing said first and second switches.

11. The memory cell of claim 10 wherein said switch control means includes third and fourth semiconductors each having a gate, a source and a drain;
a source of first address signals;
a source of second address signals; and
means respectively coupling said sources of first and second address signals to said gates of said third and fourth semiconductors.

12. A binary memory cell comprising:
first and second semiconductors each including a control terminal and first and second current conducting terminals;
a first source of reference potential;
means connecting each of said first current conducting terminals to said first source of reference potential;
a second source of reference potential;
a first capacitive load means connecting said first semiconductor second current conducting terminal to said second source of reference potential;
a second capacitive load means connecting said second semiconductor second current conducting terminal to said second source of reference potential;
means connecting said first semiconductor second current conducting terminal to said second semiconductor control terminal for holding said second semiconductor cut off when said first semiconductor is conducting;
means connecting said second semiconductor second current conducting terminal to said first semiconductor control terminal for holding said first semiconductor cut off when said second semiconductor is conducting;
sense means;
first and second switches respectively coupling said sense means to said first and second semiconductors second current conducting terminals; and
a switch control means having at least first and second electrodes and responsive to first and second address signals respectively concurrently applied thereto for closing said first and second switches.

13. The memory cell of claim 12 including first and second auxiliary current source means each having a current output terminal; and means respectively connecting said first and second auxiliary current source means output terminals to said first and second semiconductor second current conducting terminals.

References Cited

UNITED STATES PATENTS

| | | | |
|---|---|---|---|
| 3,218,613 | 11/1965 | Gribble | 340—173 |
| 3,355,721 | 11/1967 | Burns | 340—173 |
| 3,440,444 | 4/1969 | Rapp | 340—173 |

TERRELL W. FEARS, Primary Examiner

U.S. Cl. X.R.

307—238, 279